United States Patent [19]

Anselme et al.

[11] Patent Number: 5,043,071
[45] Date of Patent: Aug. 27, 1991

[54] METHOD OF BACKWASHING TUBULAR FILTER MEMBRANES, AND APPARATUS FOR IMPLEMENTING THE METHOD

[75] Inventors: Christophe Anselme, Le Pecq; Loïc Daniel, Rueil-Malmaison, both of France

[73] Assignees: Lonnaise des Eaux-Dumez, Paris; Degremont S.A., Malmaison, both of France

[21] Appl. No.: 622,942

[22] Filed: Dec. 6, 1990

[30] Foreign Application Priority Data

Oct. 17, 1990 [FR] France .................................. 90 12791

[51] Int. Cl.$^5$ .......................................... B01D 13/00
[52] U.S. Cl. ............................ 210/636; 210/791; 210/108; 210/195.2; 210/333.01; 210/411
[58] Field of Search ............ 210/791, 636, 195.2, 210/411, 321.67, 321.79, 333.1, 108, 333.01, 109, 130

[56] References Cited

U.S. PATENT DOCUMENTS

| | | | |
|---|---|---|---|
| 4,002,567 | 1/1977 | Konno et al. | 210/333.01 |
| 4,552,655 | 11/1985 | Granot | 210/108 |
| 4,592,847 | 6/1986 | Schumbacher | 210/108 |
| 4,636,306 | 6/1987 | Radmall | 210/108 |
| 4,767,539 | 8/1988 | Ford | 210/636 |
| 4,816,160 | 3/1989 | Ford et al. | 210/636 |
| 4,846,976 | 7/1989 | Ford | 210/195.2 |
| 4,921,610 | 5/1990 | Ford et al. | 210/636 |
| 4,935,143 | 6/1990 | Kopp et al. | 210/636 |

FOREIGN PATENT DOCUMENTS

| | | | |
|---|---|---|---|
| 1310789 | 12/1989 | Japan | 210/108 |
| 2147633 | 6/1990 | Japan | 210/108 |

Primary Examiner—Robert A. Dawson
Assistant Examiner—Ana Furtuna
Attorney, Agent, or Firm—Amster, Rothstein & Ebenstein

[57] ABSTRACT

A method of backwashing bundles of inside-skin tubular filter membranes in modules, in which:
- a circuit is provided so that dead-end mode filtering takes place with the tubular membranes being fed from one end while cross-flow mode filtering takes place with the tubular membranes being fed from the other end, thereby ensuring in both cases that the major portion of the matter stopped by the membranes collects in the same relatively small zone in the bundles of membranes contained in the modules;
- water is drawn off from the periphery of the modules; and
- backwashing is performed in two stages: a first stage in which all of the backwashing water is used for cleaning said relatively small zone and in which the recirculation loop that enables cross-flow filtering to be performed is closed; and a second stage in which the backwashing water is caused to pass through all of the membranes and all the recirculation loop.

Apparatus for implementing the method is also described and is shown in FIG. 1 operating in dead-end mode.

8 Claims, 1 Drawing Sheet

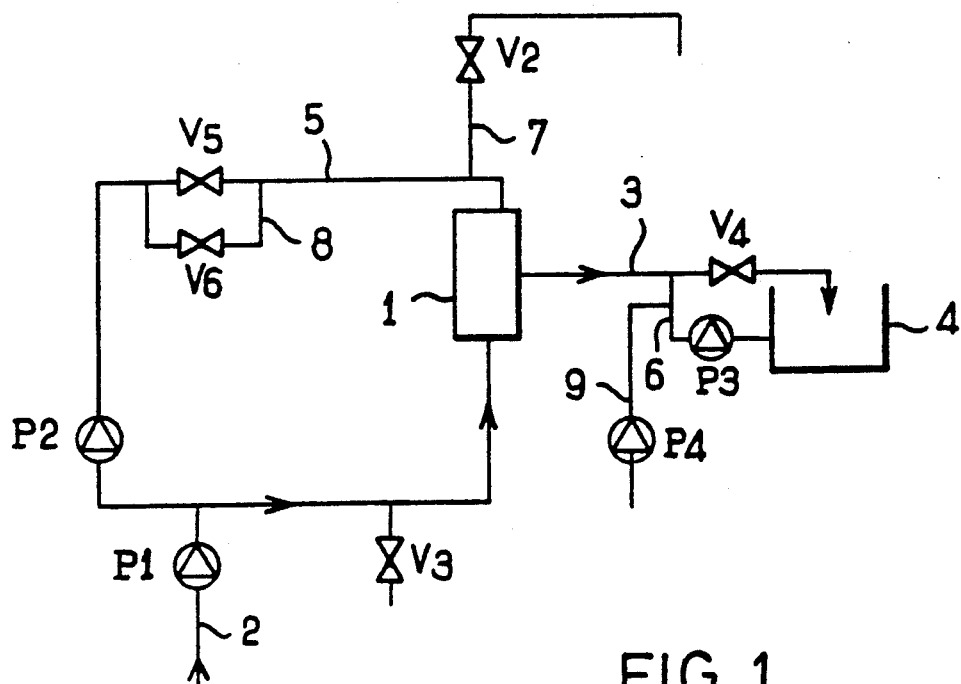
FIG_1
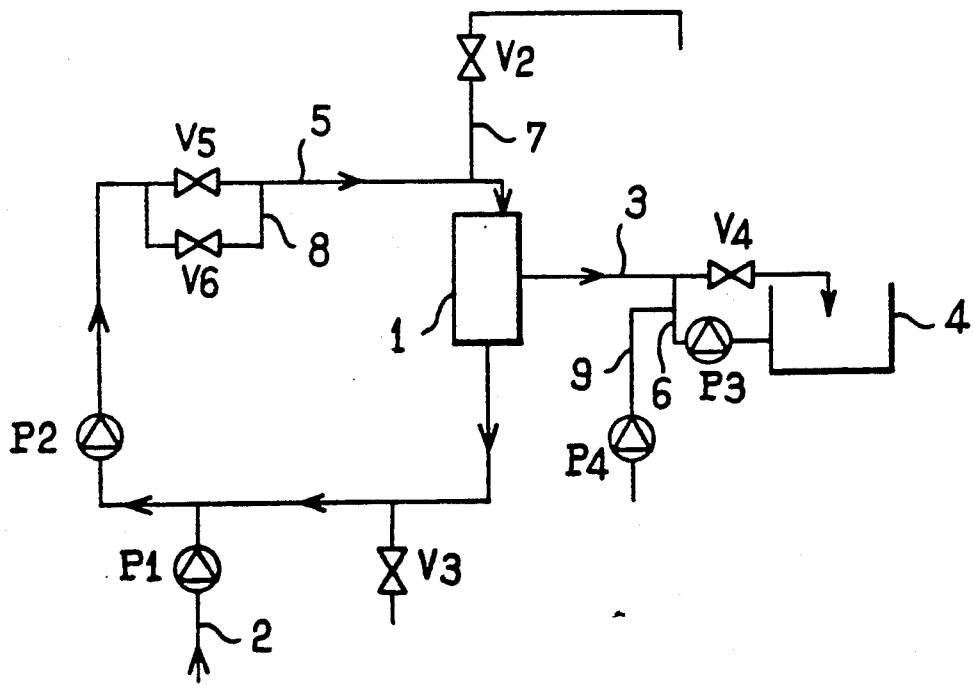
FIG_2

METHOD OF BACKWASHING TUBULAR FILTER MEMBRANES, AND APPARATUS FOR IMPLEMENTING THE METHOD

FIELD OF THE INVENTION

The invention relates to a method of backwashing tubular filter membranes, and to apparatus for implementing the method.

BACKGROUND OF THE INVENTION

At present, three modes of filtering are known and used with inside-skin tubular membranes:

dead-end filtering, where all of the water injected into the tubes passes through the membranes and is collected as a permeate (filtered water) from the periphery of a bundle of membranes, with the flow rate at the longitudinal ends of the tubes being zero, and with the membranes being cleaned by periodic backwashing when the thickness of the layer of matter in suspension stopped by the membrane and deposited thereon gives rise to an increase in head loss which, at constant flow rate, increases pressure above an acceptable threshold, the backwashing removing said layer of deposited matter, and being triggered automatically by a controller;

cross-flow filtering where only a portion of the water injected into the tubes passes through the membranes and is collected as a permeate, while the remainder is collected at the axial outlet from the membranes and is recirculated in a loop, with the membranes being cleaned both by periodic backwashing and also on a continuous basis by the flow of water along the tubes, thereby enabling a portion of the matter in suspension to be kept in suspension in the flow instead of being deposited on the membranes, thus limiting the thickness of the cake; and cross-flow filtering with continuous purging, making use of the above-described cross-flow filtering technique and where a portion of the recirculating water is purged in order to limit the concentration of matter in suspension in the circuit.

If there is a change in the turbidity or the organic matter content of the feed water beyond the threshold for good operation in dead-end mode, it would be advantageous to switch from one mode of filtering to another while using the same circuit. Circuits are generally designed either to operate in dead-end mode with water to be treated being inserted at one or other end or at both ends, or else to operate in cross-flow mode, with the recirculation pump imposing flow along the tubular membranes in one direction or the other depending on the position of the pump in the circuit, and with the pump feeding the tubular membranes from one end or the other. This applies not only to tubular membranes that are disposed horizontally, but also to tubular membranes that are disposed vertically, in which case the flow may be upwards or downwards with the membranes being fed respectively from the bottom or from the top.

However, FR-90/10 864 describes a method enabling both dead-end mode filtering and cross-flow mode filtering to be performed in the same circuit.

In any event, backwashing, which consists in injecting clean water into the modules containing the membranes in the opposite direction to that in which filtered water is collected, must ensure that the membranes are cleaned efficiently with limited consumption of energy and of clean water, and at time intervals which are large enough to be able to maintain adequate mean production of filtered water. The various different modes of backwashing that have been implemented in the past do not satisfy all of these conditions and they therefore need to be improved.

SUMMARY OF THE INVENTION

To this end, the invention provides a method of backwashing bundles of inside-skin tubular filter membranes contained in modules, in which:

a circuit is provided so that dead-end mode filtering takes place with the tubular membranes being fed from one end while cross-flow mode filtering takes place with the tubular membranes being fed from the other end, thereby ensuring in both cases that the major portion of the matter stopped by the membranes collects in the same relatively small zone in the bundles of membranes contained in the modules;

water is drawn off from the periphery of the modules; and backwashing is performed in two stages: a first stage in which all of the backwashing water is used for cleaning said relatively small zone, and in which the recirculation loop that enables cross-flow filtering to be performed is closed; and a second stage in which the backwashing water is caused to pass through all of the membranes and all of the recirculation loop.

Advantageously, after the two stages of backwashing, there follows a circuit deconcentration stage during which raw water to be treated is caused to flow through the recirculation loop and to be removed via the outlet valve for backwashing water.

The invention also provides apparatus for implementing this method, which apparatus comprises at least one filter membrane module fed with raw water by a feed pump, a recirculation loop including a recirculation pump, and a backwash circuit constituted by a duct connecting a tank for treated water to the module, a pump for delivering treated water into the module, and a duct provided with a valve for removing the backwash water leaving the module, and wherein the recirculation loop includes at least one valve. The closure thereof prevents water from flowing round the recirculation loop during dead-end filtering and during the first stage of backwashing.

Advantageously, the feed pump is disposed at the suction end of the recirculation pump, and said valve in the recirculation loop is disposed at the delivery end of the recirculation pump.

As a result, it is possible to set up feed to the modules at one end in dead-end mode and to set up feed thereto at the other end in cross-flow mode. This makes it possible to concentrate the major portion of the matter which accumulates on the membranes in a single relatively small zone of each bundle of membranes contained in the modules.

In dead-end mode, the matter in suspension accumulates at the end opposite to the feed end because of the flow of the water and because there is no outlet flow. In contrast, in cross-flow mode, the matter in suspension tends to accumulate at the inlet ends of the modules because of the higher flow rate due to the recirculation pump which is more powerful than the feed pump and this may cause the tubular membranes to be blocked.

The relatively high concentration of matter in suspension stopped by the membranes in a small zone requires this zone to be backwashed efficiently, which is done by preventing the backwashing water penetrating into the recirculation loop. That is why backwashing takes place initially with the valve(s) in the recirculation loop being closed and with the recirculation pump stopped. The flow of backwashing water injected into the modules then takes place in the direction established for dead-end filtering and pushes the major portion of the accumulated matter directly out from the module without allowing it to disperse around the circuit.

Also advantageously, the backwash water drain duct leads off from the recirculation loop in the immediate vicinity of that end of the modules where the major portion of the accumulated matter is caused to accumulate by design, thereby limiting dispersion of the accumulated matter while it is being removed.

In the second backwashing stage, the backwashing water is caused to circulate round the entire recirculation loop by putting the recirculation pump into operation and opening a valve situated on said loop.

BRIEF DESCRIPTION OF THE DRAWING

An embodiment of the invention is described by way of example with reference to the accompanying drawing, in which:

FIG. 1 is a diagram of a hydraulic circuit in apparatus using upward flow in dead-end filtering mode; and FIG. 2 corresponds to the diagram of FIG. 1, but with arrows showing downward flow for cross-flow filtering mode (with or without continuous purging).

MORE DETAILED DESCRIPTION

The apparatus of the present invention comprises at least one filter module 1 containing a bundle of inside-skin tubular membranes, with water entering the membrane tubes from one end of the module or from the other, and with filtered water being collected from the periphery of the bundle of membranes and being drawn off via a lateral orifice. The module 1 is fed with water by a duct 2 which includes a feed pump P1. The filtered water is drawn off via a duct 3 provided with a valve 4 and is delivered to a storage tank 4. A duct 5 provided with a pump P2 constitutes a recirculation loop. A valve V3 for continuous purging is provided on the recirculation loop.

The backwashing circuit is constituted by a duct 6 fitted with a pump P3 for taking water from the clean water tank 4 and reinjecting it into the filter apparatus upstream from the valve V4 which is closed during backwashing. The backwashing water is removed via a duct 7 which is fitted with a valve V2 that is opened only during backwashing.

The filter apparatus of the present invention differs from apparatuses currently in use in that it also contains a valve V5 which, when closed, prevents water from flowing round the recirculation loop during dead-end filtering and during the first stage of backwashing. A bypass circuit is provided round the valve V5 and contains a valve V6.

Advantageously, the pump P1 is at the suction end of the recirculation pump P2 while the valve V5 is at the delivery end of the pump P2. If the pump P1 were at the delivery end of the pump P2, then the flow in dead-end mode would take place through the stopped pump P2, which although possible, is not economic.

As a result, it is possible during dead-end filtering to feed the filter module from one end only, whereas in dead-end filtering using a circuit which is also designed to perform cross-flow filtering, the feed in dead-end mode takes place via both ends of the module.

In the embodiment shown in the drawings, dead-end filtering takes place upwards and cross-flow filtering takes place downwards. The opposite could also be obtained by appropriately modifying the recirculation circuit. Similarly, the same principle can be applied to filter modules mounted horizontally with horizontal water flow.

To simplify the description, it is given purely in terms of modules that are mounted vertically, operating upwards in dead-end mode and downwards in cross-flow mode.

Under these circumstances, the matter in suspension stopped by the membranes collects at the tops of the modules.

When backwashing becomes necessary, a controller controlling the opening and closing of the valves and the switching on and off of the pumps puts the backwashing circuit into action by closing the valve V4, switching on the pump P3, and opening the drain valve V2.

During a first stage in which the top portions of the modules are cleaned, the valves V5 and V6 are closed and the pump P2 is stopped (unless they were already in said states). The backwashing water injected by the pump P3 into the modules is directed upwards by the action of the pump P1, thereby expelling the cake that has collected at the tops of the modules.

Since the valves V5 and V6 are closed and the drain duct 7 is situated in the vicinity of the tops of the modules, the cake of collected matter is quickly removed without it penetrating into the recirculation loop, thereby avoiding any increase in the concentration of matter in suspension in the recirculation loop.

During the second backwashing stage, the pump P2 is switched on and the valve V6 is opened. The valve V6 is of a size suitable for causing the backwash flow to be shared between both branches of the recirculation loop: since the pump P2 is in operation with the valve V2 open to the atmosphere, the flow it delivers must be limited so that a fraction of the backwashing water continues to wash the top portion of the module. The flow is limited by using a duct 8 and a valve V6 of smaller diameter than the duct 5 and the valve V5. As a result, a fraction of the backwashing water is sucked downwards through the modules and passes into the recirculation loop prior to being removed via the duct 7, entraining the matter which is put back into suspension inside the modules.

On stopping the second stage of backwashing, it is advantageous to provide a conditioning stage or deconcentrating stage for the filter circuit by sending raw water round the recirculation loop and into the modules, and draining it via the valve V2. This has the effect of further reducing the concentration of matter still in suspension in the circuit.

In order to improve the efficiency of backwashing, a chlorination agent may be injected at the outlet from the pump P3 by means of a duct 9 fitted with a pump P4, since it has been observed that adding such an agent to the backwashing water improves the efficiency of backwashing.

The following table summarizes the states of the pumps and of the valves during the various stages described above, both during filtering and during backwashing.

TABLE

|  | P1 | P2 | P3 | P4 | V2 | V3 | V4 | V5 | V6 |
|---|---|---|---|---|---|---|---|---|---|
| FILTERING | | | | | | | | | |
| dead-end | + | − | − | − | C | C | O | C | C |
| cross-flow | + | + | − | − | C | C | O | O | C |
| c-f + purge | + | + | − | − | C | O | O | O | C |
| BACKWASHING | | | | | | | | | |
| 1st stage | + | − | + | + | O | C | C | C | C |
| 2nd stage | + | + | + | + | O | C | C | C | O |
| CONDITIONING | + | + | − | − | O | C | C | C | O |

+ = on
− = off
O = open
C = closed

The durations of the two backwashing stages and of the conditioning stage, and the frequency thereof are determined by experiment when the apparatus is commissioned, as a function of the commonest quality of water to be treated, and so as to ensure that the apparatus operates optimally both with respect to ecomonic considerations and with respect to the quality of filtered water.

In general, backwashing frequency may lie in the range 20 minutes to 24 hours, and the total duration of backwashing may lie in the range 30 seconds to 60 seconds with the time occupied by the two stages occupying varying fractions thereof, plus the time required for conditioning which may lie in the range 0 second to 60 seconds.

We claim:

1. A method of backwashing bundles of inside-skin tubular filter membranes in modules, in which:
    a circuit is provided so that dead-end mode filtering takes place with the tubular membranes being fed from one end while cross-flow mode filtering takes place with the tubular membranes being fed from the other end, thereby ensuring in both cases that the major portion of the matter stopped by the membranes collects in the same relatively small zone in the bundles of membranes contained in the modules;
    water is drawn off from the periphery of the modules; and
    backwashing is performed in two stages: a first stage in which all of the backwashing water is used for cleaning said relatively small zone and in which the recirculation loop that enables cross-flow filtering to be performed is closed; and a second stage in which the backwashing water is caused to pass through all of the membranes and all the recirculation loop.

2. A method according to claim 1, further including a deconcentration stage after the two stages of backwashing, during which deconcentration stage raw water to be treated is caused to flow through the recirculation loop and to be removed via an outlet valve for backwash water.

3. A method according to claim 1, wherein an outlet valve for the backwash water is disposed in the vicinity of said relatively small zone, downstream therefrom in the dead-end filtering flow direction.

4. A method according to claim 1, in which a chlorination agent is added to the backwash water.

5. Apparatus for implementing the method according to claim 1, comprising at least one filter membrane module fed with raw water by a feed pump, a recirculation loop including a recirculation pump, and a backwash circuit constituted by a duct connecting a tank for treated water to the module, a pump for delivering treated water into the module, and a duct provided with a valve for removing the backwash water leaving the module, wherein the recirculation loop includes at least one valve.

6. Apparatus according to claim 5, wherein said valve in the recirculation loop includes a bypass circuit fitted with a valve.

7. Apparatus according to claim 5, wherein the feed pump is disposed at the suction end of the recirculation pump, and said valve in the recirculation loop is disposed at the delivery end of the recirculation pump.

8. Apparatus according to claim 5, including a device for adding a chlorination agent.

* * * * *